(12) United States Patent
Jeon

(10) Patent No.: US 11,797,468 B2
(45) Date of Patent: Oct. 24, 2023

(54) PERIPHERAL COMPONENT INTERCONNECT EXPRESS DEVICE AND COMPUTING SYSTEM INCLUDING THE SAME

(71) Applicant: SK hynix Inc., Icheon-si (KR)

(72) Inventor: Yong Tae Jeon, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/506,889

(22) Filed: Oct. 21, 2021

(65) Prior Publication Data

US 2022/0374384 A1 Nov. 24, 2022

(30) Foreign Application Priority Data

May 24, 2021 (KR) .................. 10-2021-0066435

(51) Int. Cl.
*G06F 13/42* (2006.01)
*G06F 11/20* (2006.01)

(52) U.S. Cl.
CPC ...... *G06F 13/4221* (2013.01); *G06F 11/2007* (2013.01); *G06F 2213/0026* (2013.01)

(58) Field of Classification Search
CPC ............. G06F 11/2007; G06F 13/4221; G06F 2213/0026
See application file for complete search history.

(56) References Cited

U.S. PATENT DOCUMENTS

| | | | |
|---|---|---|---|
| 8,645,746 B2 | 2/2014 | Buckland et al. | |
| 8,848,826 B2 | 9/2014 | Lin et al. | |
| 9,424,226 B1 | 8/2016 | Weimer | |
| 9,645,965 B2 | 5/2017 | Das Sharma et al. | |
| 10,469,291 B2 | 11/2019 | Berke et al. | |
| 11,467,909 B1 | 10/2022 | Jeon et al. | |
| 2013/0089122 A1 | 4/2013 | Lin et al. | |
| 2015/0324268 A1* | 11/2015 | Du ...................... | G06F 11/3027 714/43 |
| 2016/0170918 A1* | 6/2016 | Butcher .............. | H04L 41/0654 710/307 |
| 2017/0063449 A1* | 3/2017 | Dreps ................ | H04B 10/038 |
| 2017/0346596 A1 | 11/2017 | Desimone | |

(Continued)

FOREIGN PATENT DOCUMENTS

| | | | |
|---|---|---|---|
| CN | 107066417 A | | 8/2017 |
| JP | 2013065079 A | * | 4/2013 |

(Continued)

OTHER PUBLICATIONS

EPO machine translation of JP-2013-065079A (Year: 2013).*

(Continued)

*Primary Examiner* — Glenn A. Auve

(57) ABSTRACT

A PCIe device setting, when a fail lane is detected during a link setting operation, a link by using remaining lanes includes a plurality of lanes comprising a plurality of ports, and a link controller setting a link including the plurality of lanes, wherein the link is set to have a link width that includes remaining lanes, except for a fail lane from among the plurality of lanes, wherein the fail lane from among the plurality of lanes has a state in which the fail lane is unable to form a link with remaining lanes that have not failed from among the plurality of lanes.

18 Claims, 9 Drawing Sheets

(56) References Cited

U.S. PATENT DOCUMENTS

| | | | |
|---|---|---|---|
| 2018/0095920 A1* | 4/2018 | Kwak | .................. G06F 13/385 |
| 2018/0181502 A1 | 6/2018 | Jen | |
| 2020/0192850 A1* | 6/2020 | Caruk | ................. G06F 13/4221 |
| 2020/0250368 A1 | 8/2020 | Froelich et al. | |
| 2021/0119835 A1 | 4/2021 | Levin | |
| 2022/0163588 A1 | 5/2022 | Froelich | |

FOREIGN PATENT DOCUMENTS

| | | |
|---|---|---|
| KR | 10-2014-0113592 A | 9/2014 |
| KR | 10-2018-0037783 A | 4/2018 |

OTHER PUBLICATIONS

Rangel-Patino, F., Rayas-Sanchez, J., Vega-Ochoa, E., & Hakim, N. (2018). Direct optimization of a PCI express link equalization in industrial post-silicon validation doi:http://dx.doi.org/10.1109/LATW.2018.8347238 (Year: 2018).

Ruiz-Urbina, R., Rangel-Patino, F., Rayas-Sanchez, J., Vega-Ochoa, E., & Longoria-Gandara, 0. (2021). Transmitter and receiver equalizers optimization for PCI express Gen6.0 based on PAM4 doi:http://dx.doi.org/10.1109/LAMC50424.2021.9601893 (Year: 2021).

Notice of Allowance issued for U.S. Appl. No. 17/506,953 dated Jun. 29, 2022.

TDR Impedence Measurements A Foundation for Signal Integrity; Date: 2008; Website: www.tektronix.com/oscilloscopes.

\* cited by examiner

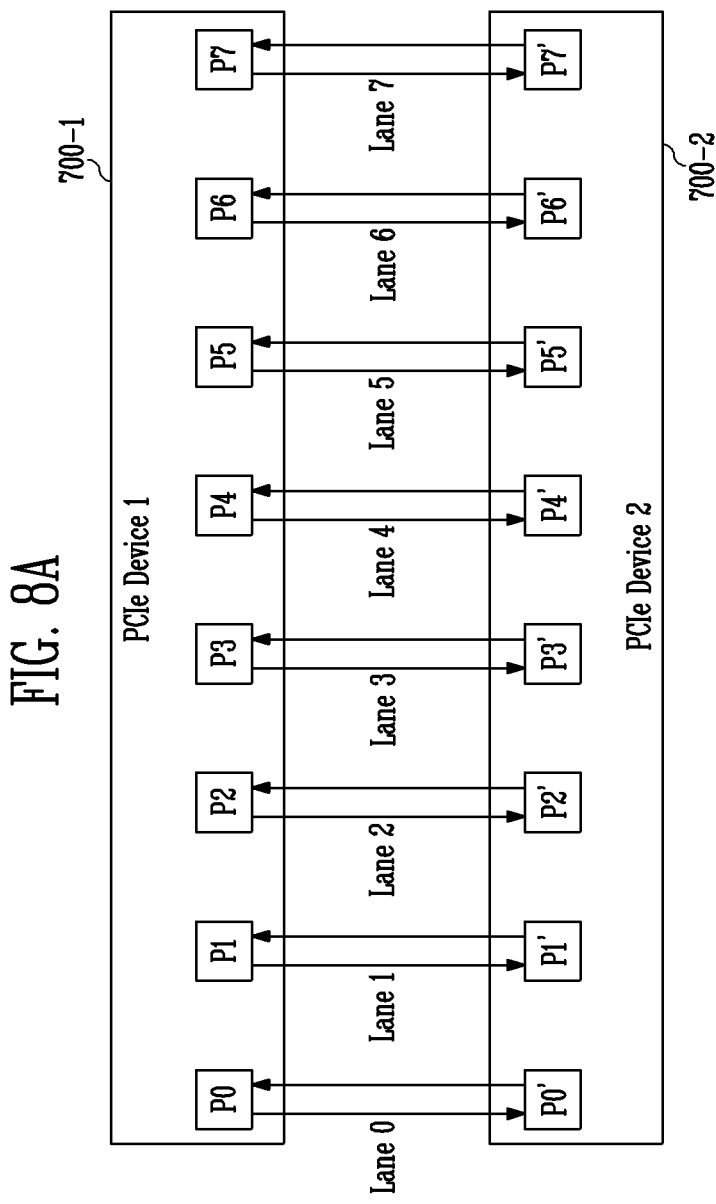

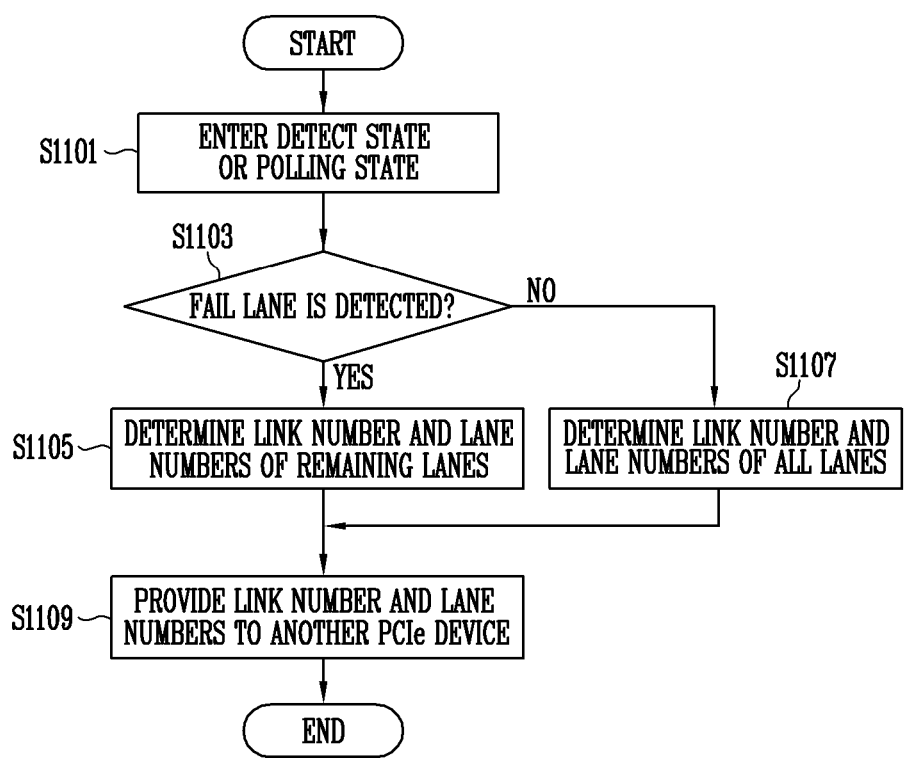

PERIPHERAL COMPONENT INTERCONNECT EXPRESS DEVICE AND COMPUTING SYSTEM INCLUDING THE SAME

CROSS-REFERENCE TO RELATED APPLICATION

The present application claims priority under 35 U.S.C. § 119(a) to Korean patent application number 10-2021-0066435, filed on May 24, 2021, in the Korean Intellectual Property Office, the entire disclosure of which is incorporated herein by reference.

BACKGROUND

1. Technical Field

Various embodiments generally relate to an electronic device, and more particularly, to a Peripheral Component Interconnect Express (PCIe) device and a computing system including the PCIe device.

2. Related Art

A Peripheral Component Interconnect Express (PCIe) device may define a bus protocol, which is used to connect input/output devices to a host device. Peripheral Component Interconnect (PCI) standards define programming concepts implemented in PCIe devices, which include a physical communication layer defined as a high-speed serial interface.

A storage device may store data under the control of a host device such as a computer or a smart phone. A storage device may include a memory device storing data and a memory controller controlling the memory device. Memory devices may be divided into volatile memory devices and non-volatile memory devices.

A volatile memory device may retain data as long as power is being supplied, and may lose stored data in the absence of power supply. Types of volatile memory devices may include Static Random Access Memory (SRAM), Dynamic Random Access Memory (DRAM), and the like.

A non-volatile memory device does not lose data even in the absence of power supply. Types of non-volatile memory devices may include Read Only Memory (ROM), Programmable ROM (PROM), Electrically Programmable ROM (EPROM), Electrically Erasable and Programmable ROM (EEPROM), flash memory, and the like.

SUMMARY

Various embodiments of the present disclosure are directed to a PCIe device in which a fail lane is detected during a link setting operation and the PCIe device establishes a link using remaining lanes, and to a computing system including the PCIe device.

According to an embodiment, a PCIe device may include a plurality of lanes comprising a plurality of ports, and a link controller setting a link including the plurality of lanes, wherein the link is set to have a link width that includes remaining lanes, except for a fail lane from among the plurality of lanes, wherein the fail lane from among the plurality of lanes has a state in which the fail lane is unable to form a link with remaining lanes that have not failed from among the plurality of lanes.

According to an embodiment, a computing system may include a first PCIe device including a plurality of downstream ports, a second PCIe device including a plurality of upstream ports, and a link including a plurality of lanes comprising the plurality of downstream ports and the plurality of downstream ports and transmitting and receiving data to from the first PCIe device, wherein the first PCIe device sets the link to have a link width including remaining lanes but not a fail lane from among the plurality of lanes, and wherein the fail lane has a state in which the fail lane is unable to form the link with the remaining lanes.

BRIEF DESCRIPTION OF THE DRAWINGS

FIGS. 8A and 8B are diagrams illustrating a link setting operation according to an embodiment of the present disclosure.

FIG. 11 is a diagram illustrating a method of operating a PCIe device according to an embodiment of the present disclosure.

DETAILED DESCRIPTION

Specific structural or functional descriptions of examples of embodiments in accordance with concepts that are disclosed in this specification are illustrated only to describe the examples of embodiments in accordance with the concepts. Examples of embodiments in accordance with the concepts may be carried out in various forms, however, and the descriptions are not limited to the examples of embodiments described in this specification.

Figure 1:
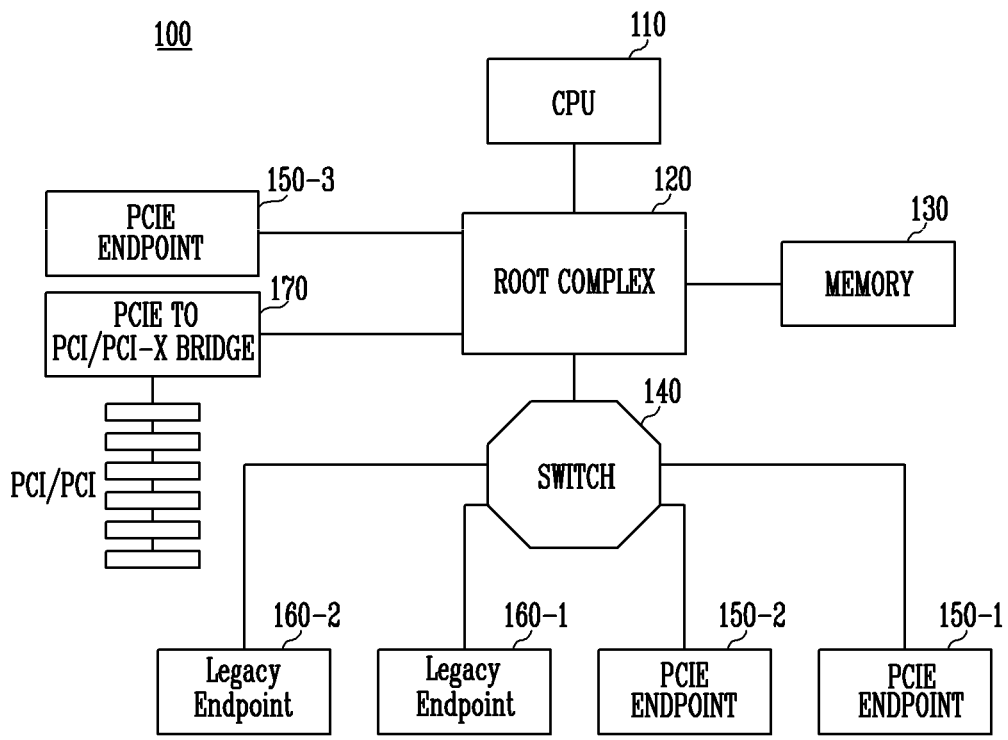
FIG. 1 is a diagram illustrating a computing system according to an embodiment of the present disclosure.

FIG. 1 is a diagram illustrating a computing system according to an embodiment of the present disclosure.

Referring to FIG. 1, a computing system 100 may include a central processing unit (CPU) 110, a root complex 120, a memory 130, a switch 140, PCIe endpoints 150_1 to 150_3, legacy endpoints 160_1 and 160_2, and a PCIe to PCI/PCI-X bridge 170.

The computing system 100 may be an electronic device that supports communication using a PCIe interface. The computing system 100 may be a personal computer (PC), a laptop computer, or a mobile computing device. The computing system 100 may include an expansion card, an expansion board, an adapter card, an add-in card, or an accessory card. In addition, the computing system 100 may include a printed circuit board (PCB) that is inserted into an electrical connector or an expansion slot on a mother board of the computing system 100 to provide additional functions to the computing system 100 through an expansion bus. In addition, the computing system 100 may include a storage device, such as solid state drive (SSD), and may include a graphic card, a network card, or a USB card.

The CPU 110 may be electrically coupled to each of the components of the computing system 100 and may control respective operations of the computing system 100. More specifically, the CPU 110 may drive an operating system or an application program to control components of hardware or software coupled to the CPU 110 and may perform various types of data processing and operations. In addition, the CPU 110 may perform software or applications for controlling the operations of the computing system 100.

The root complex 120 may be a root hub, a controller hub, or a root controller in a PCIe interconnection architecture. For example, the root complex 120 may include a chipset, a memory controller hub (MCH), a northbridge, an interconnect controller hub (ICH), a southbrdige, and a root controller/hub. In addition, the root complex 120 may connect the CPU 110 and the memory 130 to an I/O hierarchy. The root complex 120 may support peer-to-peer (P2P) routing. The root complex 120 may include at least one host bridge and root port. The root complex 120 may support at least one PCIe port.

The memory 130 may store data, commands or program codes necessary for operations of the computing system 100. According to an embodiment, the memory 130 may store program codes that are operable to execute one or more operating systems (OS) and virtual machines (VM), and program codes that execute a virtualization intermediary (VI) for managing the virtual machines (VM). In addition, the memory 130 may be realized as a volatile memory device such as DRAM or SRAM.

The switch 140 may route packets or messages upstream or downstream. More specifically, the switch 140 may route packets or messages up a hierarchy toward the root complex 120 from a PCIe endpoint (e.g., 150_1). Alternatively, however, the switch 140 may route packets or messages down a hierarchy away from the root complex 120 toward a PCIe endpoint (e.g., 150_2).

The switch 140 may be referred to as a logic assembly of a plurality of virtual PCI-to-PCI bridge devices. Examples of devices that are connected to the switch 140 may include any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Though not shown in FIG. 1, the device may include another PCIe to PCI/PCI-X bridge that supports a legacy or another version of a PCI device.

According to an embodiment, the root complex 120 may be coupled to an endpoint. The end point may refer to a type of a function that may become a requester or a completer of a PCIe transaction. The endpoint may be classified as a legacy endpoint or a PCIe endpoint.

Each of the PCIe endpoints 150_1 to 150_3 and the legacy endpoints 160_1 and 160_2 may serve as a requester or a completer of a PCIe transaction. Transaction layer packets (TLPs), which are transmitted or received by the PCIe endpoints 150_1 to 150_3 and the legacy endpoints 160_1 and 160_2, may provide configuration space headers. In addition, each of the PCIe endpoints 150_1 to 150_3 and the legacy endpoints 160_1 and 160_2 may provide a configuration request as a completer. Under specific conditions, transaction layer packets (TLPs) that are transmitted or received by the PCIe endpoints 150_1 to 150_3 and the legacy endpoints 160_1 and 160_2 must provide configuration space headers. In addition, each of the PCIe endpoints 150_1 to 150_3 and the legacy endpoints 160_1 and 160_2 must provide a configuration request as a completer.

The PCIe endpoints 150_1 to 150_3 and the legacy endpoints 160_1 and 160_2 may be classified depending on the possible size of the memory transaction. For example, when a memory transaction exceeding 4 GB is possible, an endpoint may be a PCIe end point (150_1 to 150_3). On the other hand, when a memory transaction exceeding 4 GB is impossible, an endpoint may be a legacy endpoint (160_1 and 160_2). While the PCIe endpoints 150_1 to 150_3 are not permitted to generate I/O requests, the legacy endpoints 160_1 and 160_2 may provide or generate I/O requests. In addition, the PCIe endpoint 150_3 may transmit or receive the TLPs to or from the root complex 120. Furthermore, PCI/PCI-X may transmit or receive the TLPs to or from the root complex 120 through the PCIe to PCI/PCI-X bridge 170. In addition, the PCIe endpoints 150_1 and 150_2 and the legacy endpoints 160_1 and 160_2 may transmit or receive the TLPs to or from the switch 140.

Each of the PCIe endpoints 150_1 to 150_3 may have a type 00h configuration space header. Each of the PCIe endpoints 150_1 to 150_3 may support a configuration request as a completer. PCIe-compliant software drivers and applications may be written to prevent the use of lock semantics when accessing the PCIe endpoints 150_1 to 150_3. Each of the PCIe endpoints 150_1 to 150_3 operating as the requester of a memory transaction may generate addresses greater than 4 GB. Each of the PCIe endpoints 150_1 to 150_3 may be required to support MSI or MSI-X or both when an interrupt resource is required. When MSI is implemented, each of the PCIe endpoints 150_1 to 150_3 may support the 64-bit message address version of the MSI capability structure. A minimum address range requested by a base address register may be 128 bytes. Each of the PCIe endpoints 150_1 to 150_3 may be included in one of the hierarchy domains originated by the root complex 120.

Each of the legacy endpoints 160_1 and 160_2 may have a type 00h configuration space header. Each of the legacy endpoints 160_1 and 160_2 may support a configuration request as a completer. Each of the legacy endpoints 160_1 and 160_2 may support I/O requests as a completer. Each of the legacy endpoints 160_1 and 160_2 may accept I/O requests for either or both of 80*h* and 84*h* locations regardless of an I/O decode configuration of the corresponding endpoint. Each of the legacy endpoints 160_1 and 160_2 may support I/O requests. Each of the legacy endpoints 160_1 and 160_2 may implement Extended Configuration Space Capabilities. Each of the legacy endpoints 160_1 and 160_2 may not generate addresses 4 GB or greater. Each of the legacy endpoints 160_1 and 160_2 may be required to support MSI or MSI-X or both if an interrupt resource is requested. When MSI is implemented, each of the legacy endpoints 160_1 and 160_2 may support either the 32-bit or 64-bit message address version of the MSI capability structure. Each of the legacy endpoints 160_1 and 160_2 may be permitted to support 32-bit addressing for base address registers that request memory resources. Each of the legacy endpoints 160_1 and 160_2 may be included in one of the hierarchy domains originated by the root complex 120.

Figure 2:
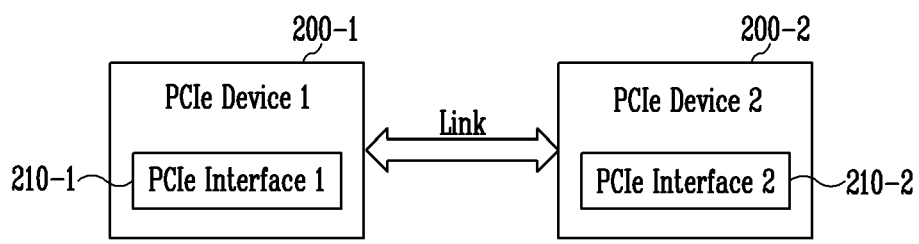
FIG. 2 is a diagram illustrating a PCIe device according to an embodiment of the present disclosure.

FIG. 2 is a diagram illustrating a PCIe device according to an embodiment of the present disclosure.

Referring to FIG. 2, a PCIe device may include a PCIe interface and be an electronic device that supports transmission and reception using the PCIe interface. For example, a first PCIe device 200-1 or a second PCIe device 200-2 may include one of the root complex 120, the switch 140, the PCIe endpoints 150_1 to 150_3, the legacy endpoints 160_1 and 160_2, and the PCIe to PCI/PCI-X bridge 170 as shown in FIG. 1.

In addition, the first PCIe device 200-1 or the second PCIe device 200-2 may perform communication using a first PCIe interface 210-1 or a second PCIe interface 210-2, respectively. More specifically, the first PCIe device 200-1 may convert data to be transmitted from the second PCIe device 200-2 into a protocol adapted for communication by using the first PCIe interface 210-1. In addition, the first PCIe device 200-1 and the second PCIe device 200-2 may form a link. The first PCIe device 200-1 and the second PCIe device 200-2 may perform communication through the link. For example, the first PCIe device 200-1 or the second PCIe device 200-2 may transmit or receive packets through the link.

Figure 3:
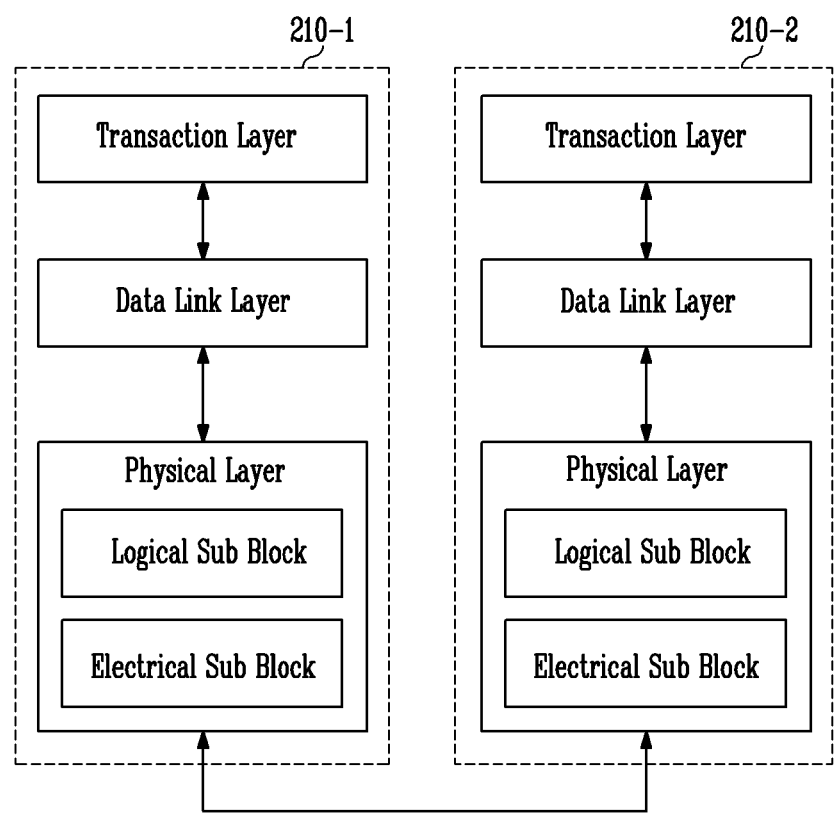
FIG. 3 is a diagram illustrating PCIe interfaces according to an embodiment of the present disclosure.

FIG. 3 is a diagram illustrating PCIe interfaces according to an embodiment of the present disclosure.

FIG. 3 shows the first PCIe interface 210-1 and the second PCIe interface 210-2 of FIG. 2. The first PCIe interface 210-1 and the second PCIe interface 210-2 may have the same structure. Thus, a description of the first PCIe interface 210-1 below may be equally applied to the second PCIe interface 210-2.

PCIe layers included in the first PCIe interface 210-1 may include three discrete logical layers. For example, the first PCIe interface 210-1 may include a transaction layer, a data link layer, and a physical layer. Each of the layers may include two sections. More specifically, one section may process outbound information (or information to be transmitted), and the other section may process inbound information (or information received). In addition, the first PCIe interface 210-1 may use packets for communicating information with other PCIe interfaces.

The transaction layer may be an upper layer in the architecture of the PCIe interface. The transaction layer may assemble and disassemble transaction layer packets (TLPs). In addition, the transaction layer may implement a split transaction, i.e., a transaction that allows other traffic to be transmitted to a link while a target system assembles data for responses. For example, the transaction layer may implement a transaction in which a request and a response are temporally separated from each other. According to an embodiment, four transaction address spaces may consist of a configuration address space, a memory address space, an input/output address space, and a message address space. A memory space transaction may include at least one of a read request and a write request for transmitting data from/to a memory-mapped location. According to an embodiment, the memory space transaction may use two different address formats, for example, a short address format such as a 32-bit address, or a long address format such as a 64-bit address. A configuration space transaction may be used to access a configuration space of a PCIe device. A transaction directed toward the configuration space may include a read request and a write request. A message space transaction (or message) may be defined to support in-band communication between PCIe devices.

The transaction layer may store link configuration information. In addition, the transaction layer may generate TLPs or may convert the TLPs into payload or status information.

A middle layer in the architecture of the PCIe interface may be the data link layer. The data link layer may serve as an intermediate stage between the transaction layer and the physical layer. The primary responsibilities of the data link layer may include link management and data integrity, including error detection and error correction. More specifically, a transmission side of the data link layer may accept the TLPs assembled by the transaction layer, apply a data protection code, or calculate a TLP sequence number. In addition, the transmission side of the data link layer may transmit the data protection code and the TLP sequence number to the physical layer. A reception side of the data link layer may check the integrity of the TLPs received from the physical layer and transmit the TLPs to the transaction layer for further processing.

The physical layer may include all circuitry for an interface operation. All circuitry may include a driver, an input buffer, a serial-to-parallel conversion circuit, a parallel-to-serial conversion circuit, phase locked loops (PLLs), and impedance matching circuitry.

In addition, the physical layer may include logical sub-blocks and electrical sub-blocks that physically transmit packets to an external PCIe device. A logical sub-block may serve to perform a 'digital' function of the physical layer. More specifically, a logical sub-block may include a transmit section that prepares transmission information by a physical sub-block and a receiver section that identifies and prepares received information before passing the received information to the data link layer. The physical layer may include a transmitter and a receiver. The transmitter may receive a symbol that is serialized by the transmitter and transmitted to an external device by the logical sub-block. In addition, the receiver may receive the serialized symbol from the external device and convert the received signal into a bit stream. The bit stream may be de-serialized and supplied to the logical sub-block. In other words, the physical layer may convert the TLPs received from the data link layer into a serialized format and convert packets received from an external device into a de-serialized format. In addition, the physical layer may include logical functions related to interface initialization and maintenance.

FIG. 3 exemplifies the architectures of the first PCIe interface 210-1 and the second PCIe interface 210-2. However, the architectures of PCIe interfaces in other embodiments may include any architecture such as a quick path interconnect architecture, a next generation high performance computing interconnect architecture, or another layered architecture.

Figure 4:
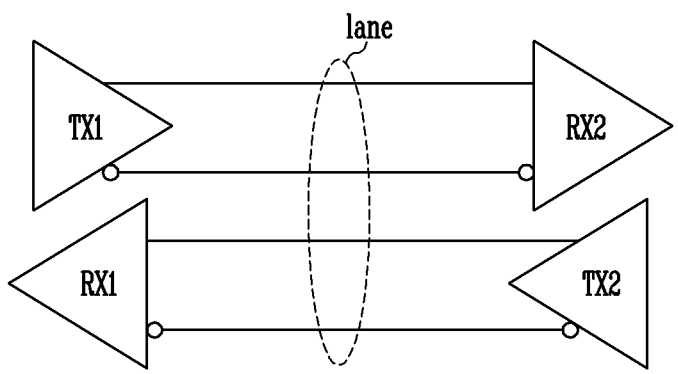
FIG. 4 is a diagram illustrating a transmitter, a receiver, and a lane according to an embodiment of the present disclosure.

FIG. 4 is a diagram illustrating a transmitter, a receiver, and a lane according to an embodiment of the present disclosure.

FIG. 4 illustrates a first transmitter TX1, a second transmitter TX2, a first receiver RX1, and a second receiver RX2. A lane may include paths that include differentially driven signal pairs, e.g., a transmission path pair configured for transmission and a reception path pair configured for reception. A PCIe device may include transmission logic that transmits data to another PCIe device and reception logic that receives data from another PCIe device. For example, a PCIe device may include two transmission paths coupled to the first transmitter TX1 and two reception paths coupled to the first receiver RX1.

A transmission path may refer to an arbitrary path for data transmission, such as a transmission line, a copper line, a wireless communication channel, an infrared communication link, or another communication path. In addition, a reception path may be realized in the same manner as the transmission path, and the reception path may be provided for reception.

A connection between two PCIe devices, for example the first PCIe device 200-1 and the second PCIe device 200-2 as shown in FIG. 2, may be referred to as a link. A link may support at least one lane. For example, the link may include a plurality of lanes. In addition, each lane may be indicated by a set of differential signal pairs (one pair for transmission and the other pair for reception). A differential signal pair may refer to two signals that have the same frequency and amplitude, but opposite phases. For example, when a first signal has a rising edge that toggles from 0 to a voltage level of V+, a second signal may have a falling edge that toggles from 0 to a voltage level of V−. A PCIe device may use signal integrity, for example, electrical characteristics such as cross-coupling, voltage overshoot/undershoot, and ringing, and may control the transmission frequency more quickly by using differential signals. In addition, a PCIe device may include a plurality of lanes to control bandwidth. For example, two PCIe devices may form a link that consists of 1, 2, 4, 8, 12, 16, or 64 lanes.

Figure 5:
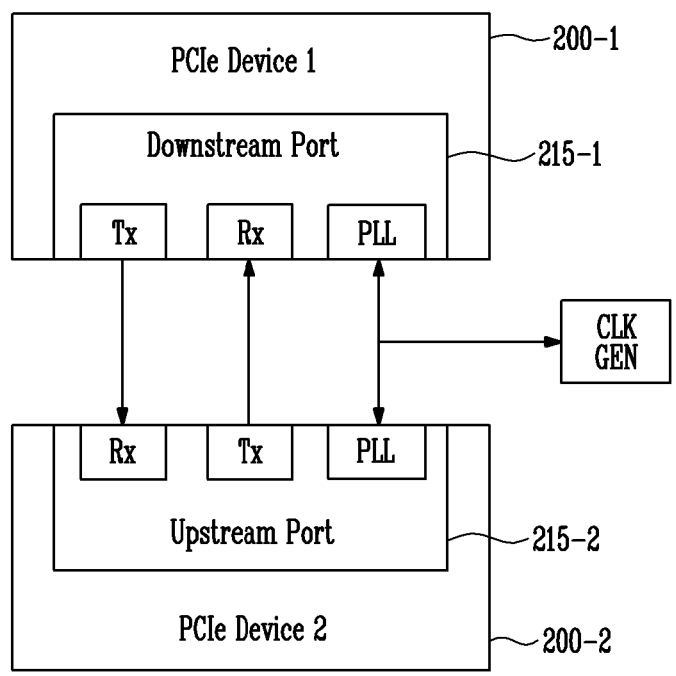
FIG. 5 is a diagram illustrating ports according to an embodiment of the present disclosure.

FIG. 5 is a diagram illustrating ports according to an embodiment of the present disclosure.

As illustrated in FIG. 5, a downstream port 215-1 and an upstream port 215-2 may be included in the first PCIe device 200-1 and the second PCIe device 200-2, respectively.

According to an embodiment, the first PCIe device 200-1 may be an upper layer compared to the second PCIe device 200-2. Data movement and transfer to an upper layer may be referred to as "upstream". On the other hand, data movement and transfer to a lower layer may be referred to as "downstream". For example, referring to FIG. 1, the switch 140 may support downstream and upstream routing. More specifically, upstream may refer to routing up a hierarchy towards the root complex 120 from the PCIe endpoint (e.g., 150_1), and downstream may refer to routing down a hierarchy away from the root complex 120 towards the PCIe endpoint (e.g., 150_2).

According to an embodiment, the first PCIe device 200-1 including the downstream port 215-1 may be referred to as an "upstream component." The upstream component may indicate the root complex 120 or the switch 140 of FIG. 1. In addition, the second PCIe device 200-2 including the upstream port 215-2 may be referred to as a "downstream component." For example, the downstream component may be one of the switch 140, the PCIe endpoints 150_1 to 150_3, the legacy endpoints 160_1 and 160_2, and the PCIe to PCI/PCI-X bridge 170 as shown in FIG. 1.

Each of the downstream port 215-1 and the upstream port 215-2 may include a transmitter Tx, a receiver Rx and a phase locked loop (PLL) circuit. The PLL circuit may generate a clock signal to be supplied to the transmitter Tx or the receiver Rx by multiplying a signal provided from a clock signal generator CLK GEN. The PLL circuit may multiply a signal received from the clock signal generator CLK GEN to generate a clock signal with a changed frequency. For example, the PLL circuit may multiply a reference clock signal REFCLK having a frequency of 100 MHz to create a clock signal having a frequency of 2.5 GHz. A transmitter Tx may convert a parallel data signal into a serial data signal by using an output signal of the PLL circuit and may transmit the serial data signal to an external device, for example, an external PCIe device. A receiver Rx may receive a serial data signal transmitted from an external device to generate a clock signal for recovering the received serial data signal and a clock signal for converting the recovered serial data signal into a parallel data signal by using an output signal of the PLL circuit. The clock signal generator CLK GEN may generate the reference clock signal REFCLK used in operations of a PCIe interface. The operations of a PCIe interface may correspond to communication with an external PCIe device.

Figure 6:
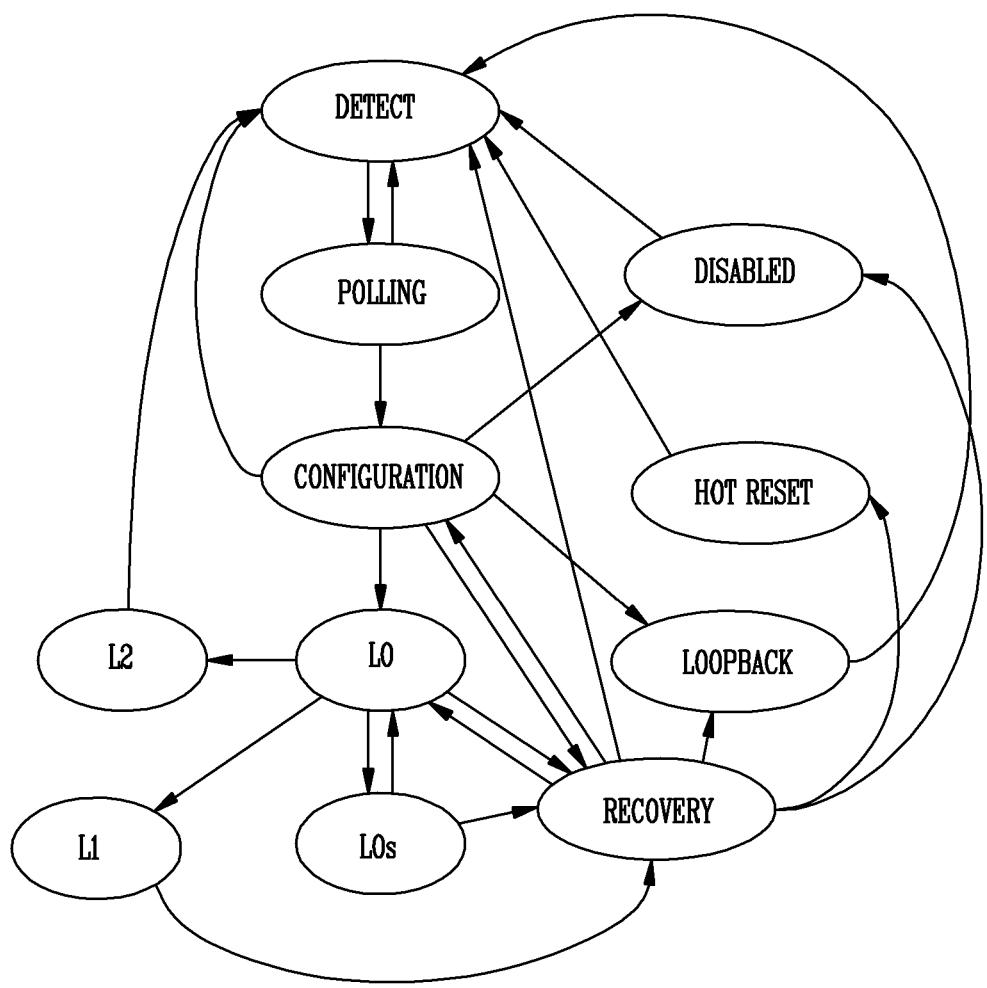
FIG. 6 is a diagram illustrating a link status of a PCIe device according to an embodiment of the present disclosure.

FIG. 6 is a diagram illustrating a link status of a PCIe device according to an embodiment of the present disclosure.

As shown in FIG. 6, a link status of a PCIe device may include detect, polling, configuration, hot reset, disabled, and L0 states.

The detect state may refer to an initial state after power on or reset. The detect state may be entered from the states to be described below. For example, the detect state may be entered from the configuration state, the hot reset state, the disabled state, an L2 state, a loopback state, and a recovery state. In the detect state, all logics, ports and registers may be reset, and a link coupled to the PCIe interface may be detected. In other words, a PCIe device in the detect state may search for a physically coupled lane.

In the polling state, a lane that enables data communication may be distinguished from the detected lanes. In the polling state, clocks at both ends of the PCIe interface may be synchronized and it may be confirmed whether the lane has a polarity of D+ or D−, for example. In addition, a data transmission speed available for the lane may be checked. In other words, in the polling state, polarity inversion may be checked. In addition, a link in the polling state may enter the detect state or the configuration state.

In the configuration state, a connection state of the lane may be checked. More specifically, in the configuration state, a lane width that enables data communication may be determined. In addition, in the configuration state, a lane reversal may be checked. The configuration state may be entered from the polling state. Alternatively, however, after entering the L0 state, the configuration state may be entered in the event of a lane reduction or a lane width increase.

The recovery state may be used to reconfigure a link bandwidth. In the recovery state, a link bandwidth of a set link may be changed, and bit lock, symbol lock and lane-to-lane de-skew may be reset. The recovery state may be entered when an error occurs in the L0 state. Thereafter, after the error is recovered in the recovery state, the state may be changed into the L0 state. In addition, according to an embodiment, in the recovery state, an equalization operation of the link may be performed.

The L0 state may be a normal operational state in which data and packets are transmitted and received through the link. More specifically, the L0 state may be an operational state of a physical bus interface where data and control packets may be transmitted and received. The L0 state may be a fully active state.

The L0s state may refer to a state in which the physical bus interface may enter quickly from a power conservation state and recover therefrom without going through the recovery state. The L0s state may be a power saving state. The L0s state may refer to an idle or standby state of some functions in the interface.

The L1 state may be a power saving state. The L1 state may refer to a state that allows additional power savings over the L0s state. The L1 state may be a low power standby state.

The L2 state may be a power saving state that aggressively conserves power. Most of the transmitters and receivers may be shut off. Although a main power supply and clocks are not guaranteed, an auxiliary power supply may be provided. The L2 state may be a low power sleep state in which power is not supplied to most of the functions.

The loopback state may be intended for test and fault isolation use. The loopback state may operate on a per lane basis and a loopback receive lane must be selected and configured.

The disabled state may allow a set link to be disabled until directed. The hot reset state may only be triggered by the downstream port. The downstream port may use training sequences (e.g., TS1 or TS2) to propagate hot reset. The training sequences (TS) may be composed of ordered sets used for initializing bit alignment, symbol alignment and to exchange physical layer parameters. In the specification, the "training sequences" may be referred to as "training sequences ordered sets."

Figure 7:
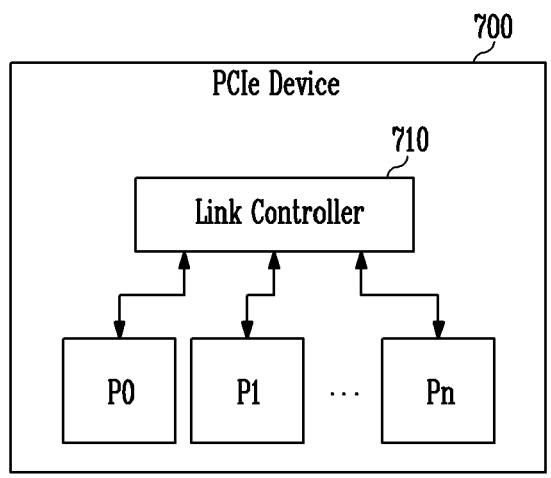
FIG. 7 is a diagram illustrating a PCIe device according to an embodiment of the present disclosure.

FIG. 7 is a diagram illustrating a PCIe device according to an embodiment of the present disclosure.

A PCIe device 700 may include a plurality of ports P0 to Pn and a link controller 710.

The plurality of ports P0 to Pn may form a plurality of lanes. For example, as shown in FIG. 4, one port may form one lane with one port in another PCIe device. According to embodiments of the disclosure, each of the plurality of ports P0 to Pn may be a downstream port, or each of the plurality of ports P0 to Pn may be an upstream port. For example, when the plurality of ports P0 to Pn are downstream ports, the PCIe device 700 may be an upstream component. In addition, when the plurality of ports P0 to Pn are upstream ports, the PCIe device 700 may be a downstream component. Each of the plurality of ports P0 to Pn may include a receiver and a transmitter.

The link controller 710 may set a link. A link may include the plurality of ports P0 to Pn. In other words, a link may be formed with the plurality of ports P0 to Pn. For example, the link controller 710 may perform a link setting operation for setting a link. The link setting operation may refer to a process of initializing and configuring a link so that the link may operate normally. The link setting operation may refer to a link initialization & training operation according to a specification of the PCIe device.

According to an embodiment, the link controller 710 may include a Link Training and Status State Machine (LTSSM). The LTSSM may be a component for performing the link setting operation.

The link controller 710 may perform link width and lane number negotiation. The link width may indicate the number of lanes that form a link. For example, the link controller 710 may determine the link width when setting the link. A lane number may indicate a number assigned to each lane. For example, during the lane setting process, the link controller 710 may negotiate a number to be assigned to each lane and determine a lane number of each lane according to the negotiation. The determined lane number may be transferred to another PCIe device, which may then accept the corresponding lane number.

According to an embodiment, the link controller 710 may detect a fail lane among a plurality of lanes during the link setting process. The fail lane may have a state in which it is unable to form a link with other lanes. Remaining lanes may refer to all lanes except for the fail lane. For example, when an error occurs in a transmission path or a reception path included in a lane, the corresponding lane may be a fail lane. The fail lane may not operate properly when transmitting data. For example, when a link is in a detect state, the link controller 710 may detect a fail lane by performing a link setting operation corresponding to the detect state. The link setting operation corresponding to the detect state may be performed to set a link in the detect state and may include an operation for detecting both ends of a link. For example, both ends of a link may be ports included in different PCIe devices coupled to each other through the link. Thereafter, the link controller 710 may perform a link setting operation corresponding to the detect state on the remaining lanes, except for the fail lane.

In addition, when a link is in a polling state, the link controller 710 may detect a fail lane by performing a link setting operation corresponding to the polling state. The link setting operation corresponding to the polling state may be performed to set the link and may include an operation of transmitting and receiving a training sequence ordered set. For example, the link setting operation corresponding to the polling state may include transmitting and receiving the training sequences ordered sets between the ports coupled through the link. Thereafter, the link controller 710 may perform the link setting operation corresponding to the polling state on the remaining lanes.

According to an embodiment, the link controller 710 may set a link to have a link width including the remaining lanes. For example, when the link is in a configuration state, a link setting operation corresponding to the configuration state may be performed on the remaining lines. The link setting operation corresponding to the configuration state may be performed to set the link in the configuration state. For example, the link setting operation corresponding to the configuration state may include setting a link width, determining a lane number, and performing a lane to lane de-skew operation.

For example, the link controller 710 may determine a link number of a link and a lane number of each of the remaining lanes in the configuration state. The link controller 710 may determine the lane number of each of the remaining lanes through a lane number negotiation operation. According to an embodiment, the link controller 710 may determine the lane number of each of the remaining lanes, and the lane number of each of the remaining lanes may increase or decrease sequentially in order.

According to an embodiment, the link controller 710 may provide other ports forming a plurality of lanes with the plurality of ports P0 to Pn with the determined link number and the determined lane numbers of the remaining lanes through the plurality of ports P0 to Pn. The other ports may be included in another PCIe device different from the PCIe device 700. For example, the link controller 710 may provide the determined link number and the determined lane number of each of the remaining lanes to other ports by using the training sequences ordered sets. Another PCIe device may accept the link number and the lane number of each of the remaining lanes.

Figure 8B:
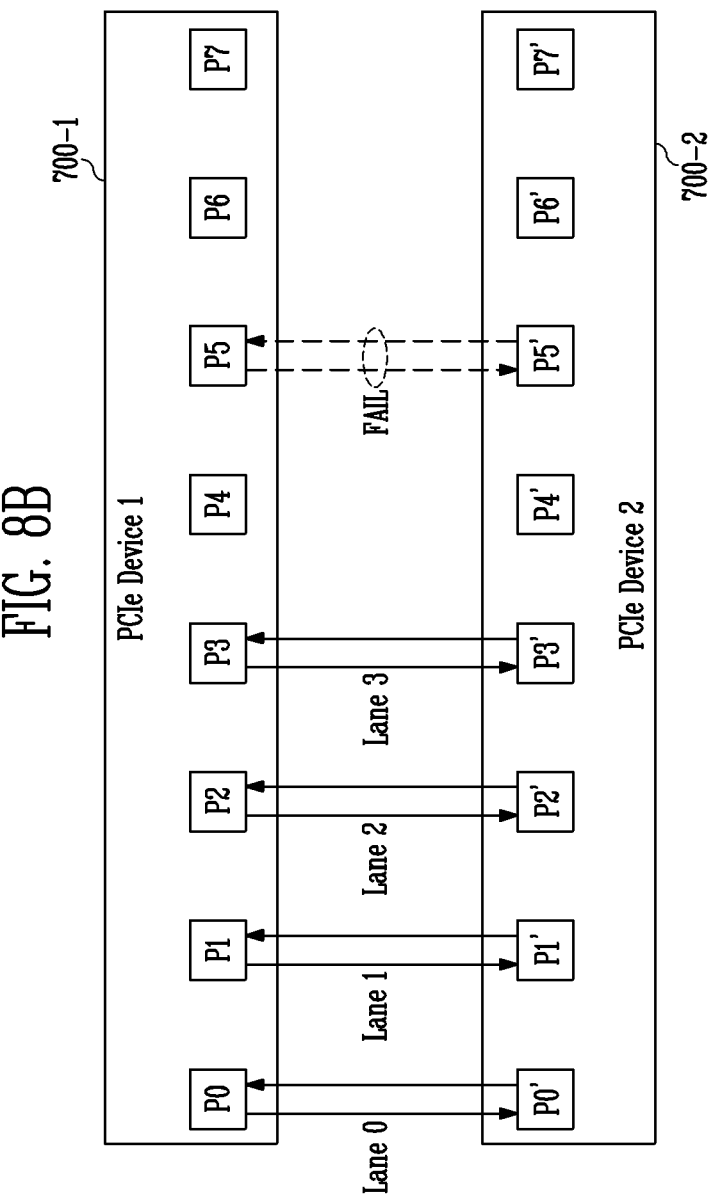

FIGS. 8A and 8B are diagrams illustrating a link setting operation according to an embodiment of the present disclosure.

Referring to FIG. 8A, a first PCIe device 700-1 and a second PCIe device 700-2 each may configure a PCIe device 700 of FIG. 7. For example, the first PCIe device 700-1 may include a plurality of downstream ports P0 to P7. In addition, the second PCIe device 700-2 may include a plurality of upstream ports P0' to P7'. However, according to other embodiments, ports included in the first PCIe device 700-1 may be upstream ports, while ports in the second PCIe device 700-2 may be downstream ports. According to an embodiment, the first PCIe device 700-1 may include downstream ports and the second PCIe device 700-2 may include upstream ports. In addition, as shown in FIG. 8A, each of the first PCIe device 700-1 and the second PCIe device 700-2 may include eight ports. However, the number of ports may vary.

The plurality of downstream ports P0 to P7 may form a plurality of lanes with the plurality of upstream ports P0' to P7'. The zero-th downstream port P0 and the zero-th upstream port P0' may form a zero-th lane Lane 0, the first downstream port P1 and a first upstream port P1' may form a first lane Lane 1, a second downstream port P2 and a second upstream port P2' may form a second lane Lane 2, a third downstream port P3 and a third upstream port P3' may form a third lane Lane 3, a fourth downstream port P4 and a fourth upstream port P4' may form a fourth lane Lane 4, a fifth downstream port P5 and a fifth upstream port P5' may form a fifth lane Lane 5, a sixth downstream port P6 and a sixth upstream port P6' may form a sixth lane Lane 6, and a seventh downstream port P7 and a seventh upstream port P7' may form a seventh lane Lane 7. The above operations of forming the lanes may occur with a link width and lane number negotiation operation.

FIG. 8B shows an example in which a lane between the fifth downstream port P5 and the fifth upstream port P5' corresponds to a fail lane when the first PCIe device 700-1 and the second PCIe device 700-2 set a link.

The first PCIe device 700-1 may perform a lane number negotiation on the plurality of downstream ports P0 to P7 so that port numbers of the plurality of downstream ports P0 to P7 increase sequentially. Therefore, according to the PCIe specifications, since the lane between the fifth downstream port P5 and the fifth upstream port P5' is a fail lane, lane number negotiation for the sixth downstream port P6 and the seventh downstream port P7 may not be performed. The lane between the sixth downstream port P6 and the sixth upstream port P6' and the lane between seventh downstream port P7 and the seventh upstream port P7' may both be electrically idle.

In addition, according to the PCIe specifications, the link width may be determined by one of a first lane, a second lane, a fourth lane, an eighth lane, a 12th lane, a 16th lane and a 32nd lane. Therefore, the first PCIe device 700-1 may set a link to have a link width including four lanes Lane 0 to Lane 3, for example. The link may consist of only the four lanes Lane 0 to Lane 3. Although the lane between the fourth downstream port P4 and the fourth upstream port P4' is not a fail lane, this lane may be in electrical idle.

However, the performance of the PCIe device may be lowered because the lane between the fourth downstream port P4 and the fourth upstream port P4', the lane between the sixth downstream port P6 and the upstream port P6' and the lane between the seventh downstream port P7 and the seventh upstream port P7' are unavailable. Accordingly, an operation that excludes a fail lane and a method for forming a link using allowable remaining lanes may be required.

Figure 9:
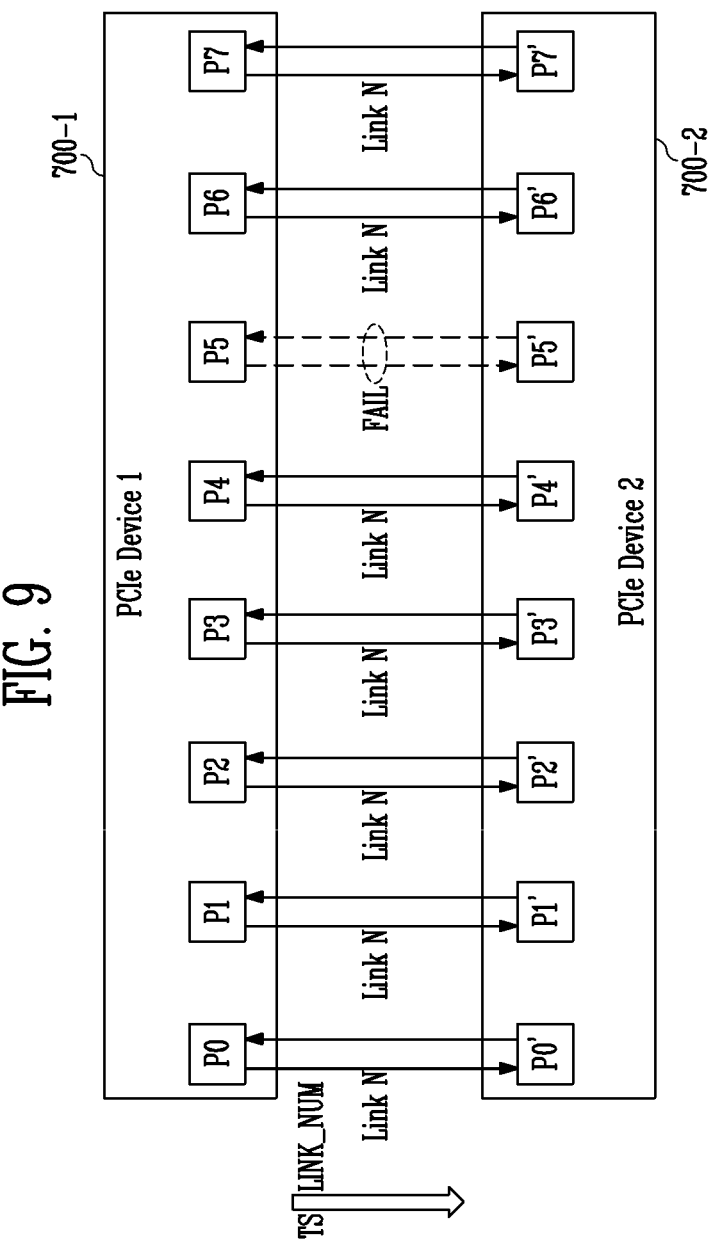
FIG. 9 is a diagram illustrating an operation of determining a link number according to an embodiment of the present disclosure.

FIG. 9 is a diagram illustrating an operation of determining a link number according to an embodiment of the present disclosure.

Referring to FIG. 9, a first PCIe device 700-1 may detect a fail lane through a link setting operation in a detect state or a polling state.

The first PCIe device 700-1 may determine a link number Link N in a configuration state. The first PCIe device 700-1 may provide upstream ports P0' to P4', P6', and P7' with training sequences ordered sets TS including information LINK_NUM about a link number through the downstream ports P0 to P4, P6, and P7, except a fifth downstream port P5 coupled to a fail lane. A second PCIe device 700-2 may receive the training sequences ordered sets TS through the upstream ports P0' to P4', P6', and P7', and may accept the link number Link N.

Figure 10:
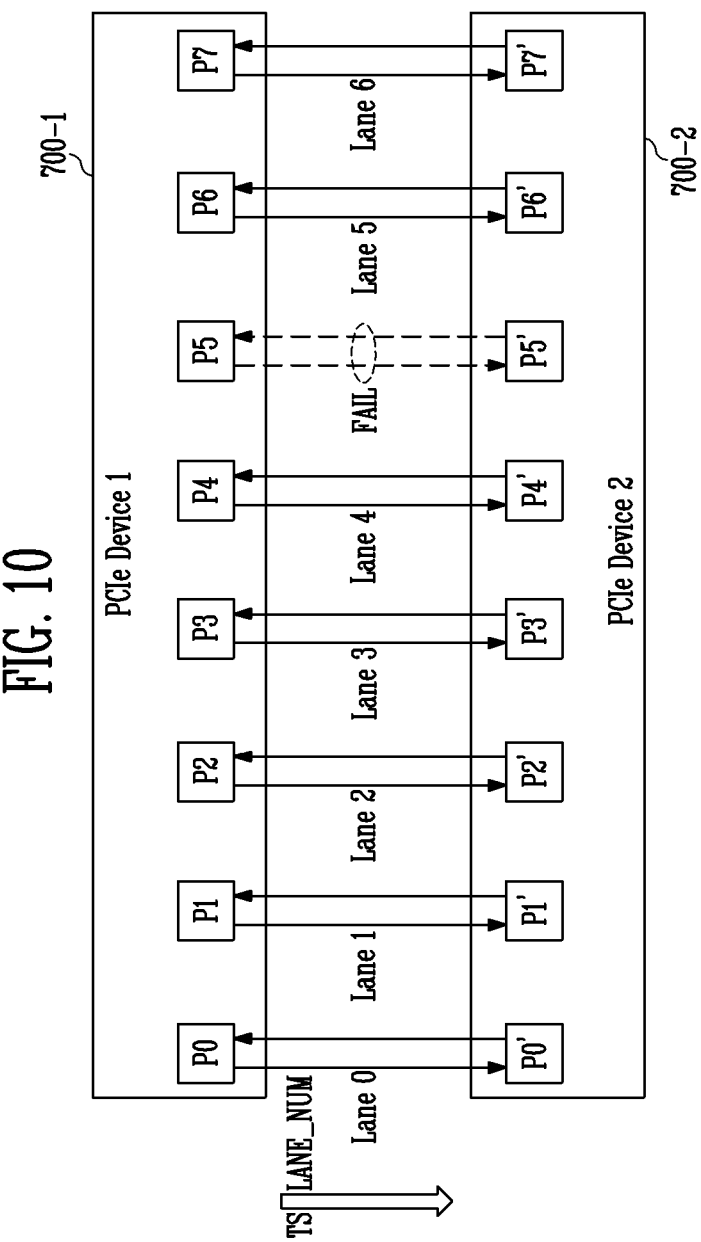
FIG. 10 is a diagram illustrating an operation of determining a lane number according to an embodiment of the present disclosure.

FIG. 10 is a diagram illustrating an operation of determining a lane number according to an embodiment of the present disclosure.

Referring to FIG. 10, a first PCIe device 700-1 may detect a fail lane through a link setting operation in a detect state or a polling state.

The first PCIe device 700-1 may determine a lane number of each of the remaining lanes, except for the fail lane, in the configuration state. The first PCIe device 700-1 may determine the lane number of each of the remaining lanes such that lane numbers of the remaining lanes may ascend or descend in sequential order. For example, the first PCIe device 700-1 may sequentially increase lane numbers from the lane between the zero-th downstream port P0 and the zero-th upstream port P0' to the lane between the seventh downstream port P7 and the seventh upstream port P7', skipping the fail lane. Therefore in this example, the lane between the zero-th downstream port P0 and the zero-th upstream port P0' may be determined as the zero-th lane Lane 0. The lane between the first downstream port P1 and the first upstream port P1' may be determined as the first lane Lane 1. The lane between the second downstream port P2 and the second upstream port P2' may be determined as the second lane Lane 2. The lane between the third downstream port P3 and the third upstream port P3' may be determined as the third lane Lane 3. The lane between the fourth downstream port P4 and the fourth upstream port P4' may be determined as the fourth lane Lane 4. The lane between the sixth downstream port P6 and the sixth upstream port P6' may be determined as the fifth lane Lane 5. The lane between the seventh downstream port P7 and the seventh upstream port P7' may be determined as the sixth lane Lane 6. For convenience of explanation, FIG. 10 illustrates lane numbers of the remaining lanes increasing sequentially. However, an operation to determine the lane numbers of the remaining lanes that decreases sequentially may also be utilized.

In addition, the first PCIe device 700-1 may provide the upstream ports P0' to P4', P6', and P7' with the training sequences ordered sets TS, including information LANE_NUM about a lane number, through the downstream ports P0 to P4, P6, and P7, except the fifth downstream port P5 coupled to a fail lane. For example, the zero-th downstream port P0 may provide the zero-th upstream port P0' with information about the zero-th lane Lane 0 through the training sequences ordered sets TS. The first downstream port P1 may provide the first upstream port P1' with information about the first lane Lane 1 through the training sequences ordered sets TS. The second downstream port P2 may provide the second upstream port P2' with information about the second lane Lane 2 through the training sequences ordered sets TS. The third downstream port P3 may provide the third upstream port P3' with information about the third lane Lane 3 through the training sequences ordered sets TS. The fourth downstream port P4 may provide the fourth upstream port P4' with information about the fourth lane Lane 4 through the training sequences ordered sets TS. The sixth downstream port P6 may provide the sixth upstream port P6' with information about the fifth lane Lane through the training sequences ordered sets TS. The seventh downstream port P7 may provide the seventh upstream port P7' with information about the sixth lane Lane 6 through the training sequences ordered sets TS.

The second PCIe device 700-2 may receive the training sequences ordered sets TS through the upstream ports P0' to P4', P6', and P7' and accept the lane numbers Lane 0 to Lane 6.

Therefore, according to an embodiment, by setting a link to have a link width including the remaining lanes except for a fail lane, a link may be formed using an activated operation or allowable lanes. According to another embodiment, a link may be formed using an operation on some of allowable lanes instead of an operation on all allowable lanes. For example, the second PCIe device 700-2 may accept the lane numbers Lane 0 to Lane 5 using an operation on six allowable lanes among the seven allowable lanes Lane 0 to Lane 6.

FIG. 11 is a diagram illustrating a method of operating a PCIe device according to an embodiment of the present disclosure.

The method of FIG. 11 may be performed by a PCIe device 700 as shown in FIG. 7.

Referring to FIG. 11, at step S1101, the PCIe device 700 may enter a detect state or a polling state during a link setting operation.

At step S1103, the PCIe device 700 may determine whether a fail lane from among a plurality of lanes is detected. For example, when a link is in the detect state, the PCIe device 700 may detect the fail lane by a link setting operation corresponding to the detect state. In addition, when the link is in the polling state, the PCIe device 700 may detect the fail lane by the link setting operation corresponding to the polling state.

When the fail lane is detected as a result of determination at step S1103, the PCIe device 700 may determine a link number and a lane number of each of the remaining lanes at step S1105. For example, the PCIe device 700 may determine the lane number of each of the remaining lanes such that lane numbers of the remaining lanes may increase or decrease sequentially in the configuration state.

When the fail lane is not detected as the result of determination at step S1103, the PCIe device 700 may determine a link number and lane numbers of all lanes at step S1107.

At step S1109, the PCIe device 700 may provide the determined link number and the determined lane numbers to another PCIe device. Another PCIe device may accept the determined link number and the determined lane numbers.

According to the present disclosure, a PCIe device capable of setting, when a fail lane is detected during a link setting operation, a link using the remaining lanes, and a computing system including the PCIe device may be provided.

In addition, according to the present disclosure, when a fail lane is detected during a link setting operation, performance of a PCIe device may be improved by configuring the remaining lanes as logically continuous lanes.

In the above-discussed embodiments, all steps may be selectively performed or skipped. In addition, the steps in each embodiment may not always be performed in regular order. Furthermore, the embodiments disclosed in the present specification and the drawings aims to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure. It will be apparent to those skilled in the art that various modifications can be made to the above-described exemplary embodiments of the present disclosure without departing from the spirit or scope of the invention. Thus, it is intended that the present disclosure cover all such modifications provided they come within the scope of the appended claims and their equivalents.

What is claimed is:

1. A PCIe device, comprising:
   a plurality of lanes comprising a plurality of ports; and
   a link controller setting a link including the plurality of lanes, wherein the link is set to have a link width that includes remaining lanes except for a fail lane from among the plurality of lanes, determines lane numbers of the remaining lanes so that the lane numbers increase or decrease sequentially, and provides the lane numbers of the remaining lanes to a plurality of other ports forming the plurality of lanes with the plurality of ports through the plurality of ports,
   wherein the fail lane from among the plurality of lanes has a state in which the fail lane is unable to form a link with the remaining lanes that have not failed from among the plurality of lanes.

2. The PCIe device of claim 1, wherein the link controller includes a Link Training and Status State Machine (LTSSM) setting the link.

3. The PCIe device of claim 1, wherein when the link is in a detect state, the link controller detects the fail lane by a link setting operation corresponding to the detect state and performs the link setting operation corresponding to the detect state on the remaining lanes.

4. The PCIe device of claim 1, wherein when the link is in a polling state, the link controller detects the fail lane by a link setting operation corresponding to the polling state and performs the link setting operation corresponding to the polling state on the remaining lanes.

5. The PCIe device of claim 1, wherein when the link is in a configuration state, the link controller performs a link setting operation corresponding to the configuration state on the remaining lanes.

6. The PCIe device of claim 5, wherein the link controller determines a link number of the link and the lane numbers of the remaining lanes, respectively, in the configuration state.

7. The PCIe device of claim 6, wherein the link controller determines the lane numbers of the remaining lanes by a lane number negotiation operation.

8. The PCIe device of claim 6, wherein the link controller provides the plurality of other ports with the link number through the plurality of ports.

9. The PCIe device of claim 8, wherein the link controller provides the link number and the lane numbers of the remaining lanes to the plurality of other ports by using training sequences ordered sets.

10. A computing system, comprising:
    a first PCIe device including a plurality of downstream ports;
    a second PCIe device including a plurality of upstream ports; and
    a link including a plurality of lanes comprising the plurality of downstream ports and the plurality of upstream ports,
    wherein the first PCIe device sets the link to have a link width including remaining lanes except for a fail lane from among the plurality of lanes, determines lane numbers of the remaining lanes so that the lane numbers increase or decrease sequentially, and provides the lane numbers of the remaining lanes to the plurality of upstream ports through the plurality of downstream ports, wherein the second PCIe device accepts the lane numbers of the remaining lanes, and wherein the fail lane has a state in which the fail lane is unable to form the link with the remaining lanes.

11. The computing system of claim 10, wherein the first PCIe device includes a Link Training and Status State Machine (LTSSM) for setting the link.

12. The computing system of claim 10, wherein when the link is in a detect state, the first PCIe device detects the fail lane by a link setting operation corresponding to the detect state and performs the link setting operation corresponding to the detect state on the remaining lanes.

13. The computing system of claim 10, wherein when the link is in a polling state, the first PCIe device detects the fail lane by a link setting operation corresponding to the polling state and performs the link setting operation corresponding to the polling state on the remaining lanes.

14. The computing system of claim 10, wherein when the link is in a configuration state, the first PCIe device performs a link setting operation corresponding to the configuration state on the remaining lanes.

15. The computing system of claim 14, wherein the first PCIe device in the configuration state determines a link number of the link and the lane numbers of the remaining lanes.

16. The computing system of claim 15, wherein the first PCIe device determines the lane numbers of the remaining lanes by a lane number negotiation operation.

17. The computing system of claim 15, wherein the second PCIe device accepts the link number.

18. The computing system of claim 17, wherein the first PCIe device provides the link number and the lane numbers of the remaining lanes to the plurality of upstream ports through training sequences ordered sets.

* * * * *